(12) United States Patent
Hilaireau et al.

(10) Patent No.: US 8,475,568 B2
(45) Date of Patent: Jul. 2, 2013

(54) PROCESS FOR THE ENRICHMENT OF ISOTOPES

(75) Inventors: Pierre Hilaireau, Saint Max (FR); Wieslaw Majewski, Laxou (FR)

(73) Assignee: Isosilicon AS, Kristiansand (NO)

( * ) Notice: Subject to any disclaimer, the term of this patent is extended or adjusted under 35 U.S.C. 154(b) by 348 days.

(21) Appl. No.: 13/058,539

(22) PCT Filed: Oct. 28, 2008

(86) PCT No.: PCT/IB2008/003448
§ 371 (c)(1),
(2), (4) Date: Feb. 11, 2011

(87) PCT Pub. No.: WO2010/018423
PCT Pub. Date: Feb. 18, 2010

(65) Prior Publication Data
US 2011/0139001 A1    Jun. 16, 2011

(30) Foreign Application Priority Data
Aug. 14, 2008  (WO) .......................... PCT/IB08/3159

(51) Int. Cl.
*B01D 53/02*   (2006.01)
(52) U.S. Cl.
USPC .................................................. 95/82; 95/88
(58) Field of Classification Search
USPC ....................................................... 95/82, 88
See application file for complete search history.

(56) References Cited

U.S. PATENT DOCUMENTS

| 4,711,768 A | 12/1987 | Peterson |
| 5,265,135 A | 11/1993 | Impink |
| 5,470,479 A | 11/1995 | Snyder |
| 7,309,377 B2 * | 12/2007 | Eriksen et al. .................... 95/82 |

FOREIGN PATENT DOCUMENTS

| EP | 0173484 | 3/1986 |
| GB | 1211104 | 11/1970 |
| GB | 2005648 | 4/1979 |

* cited by examiner

*Primary Examiner* — Robert Clemente
(74) *Attorney, Agent, or Firm* — Christian D. Abel

(57) ABSTRACT

This invention relates to a process for the enrichment of isotopes by chromatography on a saturated stationary phase. The process provides a more efficient method than the existing methods.

13 Claims, 1 Drawing Sheet

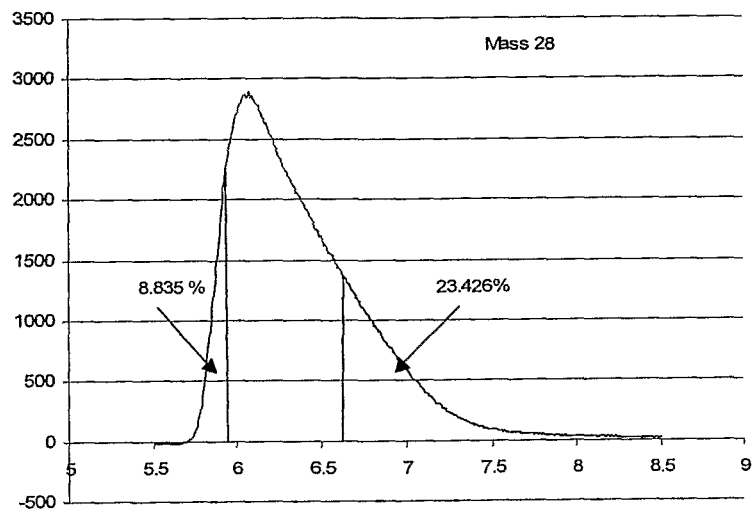
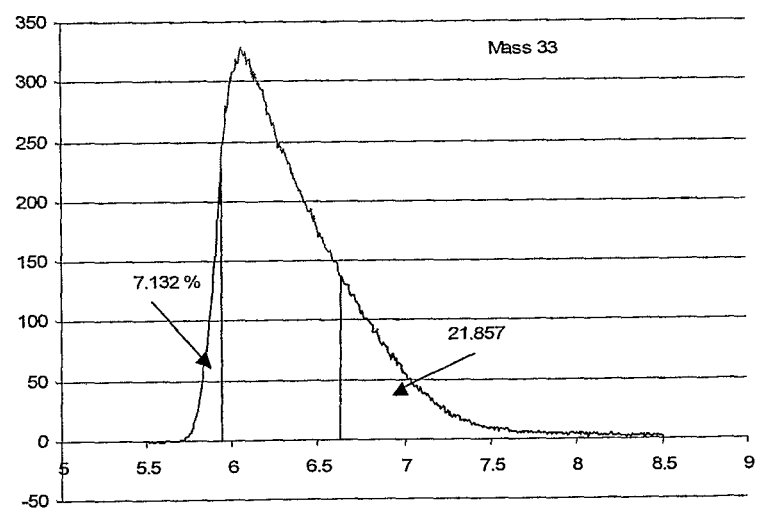

PROCESS FOR THE ENRICHMENT OF ISOTOPES

FIELD OF THE INVENTION

The invention relates to a process for the enrichment of isotopes by chromatography.

BACKGROUND OF THE INVENTION

Isotopes of an element have nuclei with the same number of protons (the same atomic number) but different numbers of neutrons. Therefore, isotopes have a different total number of nucleons (different mass number), which is the number of protons plus neutrons. Different isotopes of a given element all have the same number of protons and electrons, and therefore the same electronic structure.

Thus the physical and chemical properties of different isotopes are very similar. But isotopically pure components can be very useful in industry because they show slightly different properties. For example, isotopically pure $^{28}Si$ can be used to solve heat problems in high performance silicon chips. $^{13}C$ is commonly used in research science and medicine.

There is a need to develop efficient methods for separation of isotopes. Since isotopes have very similar chemical properties, sophisticated processes have been set up. For example, some processes are based on diffusion, centrifugal effect, electromagnetic, laser, chemical exchange, gravity, or chromatography.

The US Patent Application no 2005/0247195 discloses a method for separation of isotopes, where a specific isotope of an isotope composition is purified by exploiting the difference in the isotope's mass diffusivity by making the natural isotope composition, in one cycle, travel in a mass stream through a media by diffusion and optionally also convection, and thus obtain a fractioning of the isotopes such that the wanted isotope is enriched in one fraction of the mass stream, collecting this enriched fraction of the mass stream and sending it through another cycle to obtain a fraction with higher content of the wanted isotope, and repeat these cycles until the wanted isotope has become sufficiently enriched, characterised in that the hydrogen is used as ligand on the element that is to be separated, and that the hydrogen and the element that is to be separated is employed in the form of a chemical compound that is in a gaseous state at the actual pressure and temperature, and that the gaseous hydrides are separated by mass diffusion through a chromatographic column. However, the method needs several stages before obtaining the required purity.

SUMMARY OF THE INVENTION

The object of the present invention is to provide a more efficient method than the existing methods.

This object is achieved with a process for the enrichment of an isotope composition by chromatography on a saturated stationary phase.

Preferred embodiments comprise one or more of the following features.

In an embodiment of the process, the stationary phase is saturated with at least partially the composition to be enriched.

In another embodiment of the process, the isotope composition to be enriched is gaseous.

In another embodiment of the process, a ligand is added to the isotope composition to form a gaseous composition.

In another embodiment of the process, the ligand is hydrogen or fluoride.

In another embodiment, the process comprises the steps of the saturation of the stationary phase with at least partially the composition to be enriched ; the enrichment of the composition by exploiting the difference in the isotope mass diffusivity.

In another embodiment of the process, the carrier gas is helium or hydrogen.

In another embodiment of the process, the stationary phase is an adsorbing porous material chosen between a bed of particules, a monobloc and a molecular sieve.

In another embodiment of the process, the adsorbing porous material is a zeolite.

In another embodiment of the process, the isotope composition comprises an element chosen within carbon, nitrogen, silicon, helium, boron, oxygen, sulphur, chloride, gallium, germanium, selenium, bromine, antimony, tellurium, uranium or compounds containing different isotopes.

In another embodiment, the saturation step is made with the isotope of interest enriched above its natural abundance.

In another embodiment, the length of the chromatographic column is less than 2 meters.

In another embodiment of the process the gaseous composition is silane for separating $^{28}Si$, $^{29}Si$ and $^{30}Si$.

In another embodiment of the process, the gaseous composition is one of $B_2H_6$, $NH_3$, $CH_4$, $H_2O$, $H_2S$, $HCl$, $GaH_3$, $GeH_4/Ge_2H_6$, $H_2Se$, $HBr$, $H_3Sb$, $H_2Te$, and $UF_6$ for obtaining an isotopically pure fraction of B, N, C, O, S, Cl, Ga, Ge, Se, Br, Sb, Te, and U, respectively.

In another embodiment of the process, the pressure in the chromatographic column is comprised between 0 and 10 bar.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 1 shows the mass spectra of an enrichment of silane.

DETAILED DESCRIPTION OF THE INVENTION

The present invention relates to a process for the enrichment of an isotope composition by chromatography on a saturated stationary phase.

The use of a saturated stationary phase in the chromatography considerably enhances the efficiency of the enrichment process which is much faster than the existing methods.

Most isotopes can be enriched by the process disclosed. Preferably, the isotopes of the elements carbon, nitrogen, silicon, helium, boron, oxygen, sulphur, chloride, gallium, germanium, selenium, bromine, antimony, tellurium, uranium or compounds containing different isotopes (e.g. heavy water) can be enriched. More preferably, the isotopes of silicon can be enriched.

Preferably, the stationary phase is saturated with at least partially the composition to be enriched. More preferably, the stationary phase is saturated only with the composition to be enriched.

One of the best properties that can be used for the separation of isotopes is the mass diffusion constant. Diffusivities are much larger in gas than in liquids therefore the separation is more efficient with gaseous compounds. Preferably, the isotope composition to be enriched is gaseous. If the isotope composition is not gaseous, ligands are added to form a gaseous composition. Furthermore, the mass diffusion constant is approximately inverse proportional to the square of the mass of the molecule or atom. The lighter the compounds, the larger the difference in the diffusion coefficient and the better the separation. The ligand can be a compound which forms gaseous compounds with the elements of interest comprised in the isotope composition. The ligand can be chosen among the group comprising halogens and hydrogen. Preferably, the ligand is hydrogen. Hydrogen is the lightest ligand which can be used and thus give the best results.

The preferred gaseous compounds are $B_2H_6$, $NH_3$, $CH_4$, $H_2O$, $H_2S$, HCl, $Ga_2H_6$, $GeH_4$ and $Ge_2H_6$, $H_2Se$, HBr, $H_2Sb$, $H_2Te$, $SiF_4$, and $SiH_4$. Preferably, the gaseous compound is a hydrogen gaseous compound. More preferably, the gaseous compound is one of $B_2H_6$, $NH_3$, $CH_4$, $H_2O$, $H_2S$, HCl, $GaH_3$, $GeH_4$ and $Ge_2H_6$, $H_2Se$, HBr, $H_3Sb$, $SiH_4$ and $H_2Te$ or others, e.g $UF_6$ for obtaining an isotopically pure fraction of B, N, C, O, S, Cl, Ga, Ge, Se, Br, Sb, Si, U and Te respectively. Even more preferably, the gaseous compound is silane $SiH_4$ for isotopically separating $^{28}Si$ from $^{29}Si$ and $^{30}Si$.

The process comprises a first step in which the stationary phase of the chromatographic column is saturated. The saturation step consists in saturating the stationary phase with at least partially the gaseous composition to be enriched. For example, the stationary phase can be saturated with a gaseous composition which has previously been enriched. Preferably, the stationary phase is saturated only with the gaseous composition to be enriched. Substantially all adsorption sites of the stationary phase are filled with molecules of the gaseous composition to be enriched. The saturation step can be performed by injection of the gaseous composition in pure or diluted form. The injection can be realized once or there can be several injections (for example, several injections of a few milliliters on a 2.2 mm i.d. column of 1 m long). Hence the final stationary phase is the stationary phase on which the gaseous composition is adsorbed.

Preferably, the saturation step is made with the isotope of interest in which the gaseous composition has to be enriched in.

The second step consists of chromatography based on the difference of diffusion of the isotopes in the stationary phase, with the stationary phase prepared as mentioned above. The gaseous composition is injected in the column. The separation of the isotopes is done by exploiting the difference in the isotopes mass diffusivity. This separation is enhanced by the use of a stationary phase prepared in the first step, comprising adsorbed molecules of the gaseous phase to be enriched. The isotopes will leave the column in the form of concentration profiles (chromatographic peaks) whose breadth will depend on their respective diffusion coefficient: the lighter the component of an isotopic mixture, the greater its diffusion and the broader its peak and therefore the resulting gas should be collected at an appropriate time, depending on which isotope the gaseous composition has to be enriched in. Surprisingly, the use of this particular stationary phase in this enrichment method shows an efficient enrichment of the gaseous composition and enables the use of a short chromatographic column. Moreover, the retention time of the compounds of interest in the column are shortened, up to 10 to 66 times shorter than the commonly used enrichment methods. The efficiency of the process is then greatly improved.

The carrier gas can be any noble gas, nitrogen or hydrogen. Preferably, the carrier gas is nitrogen, helium, argon, or hydrogen. More preferably, the carrier gas is hydrogen.

The stationary phase is an adsorbing porous material. The adsorbing porous material can be any type of adsorbing porous material, which presents a strong adsorption with the molecules of the gaseous composition. The adsorption must be strong enough to avoid the adsorbed molecules of the gaseous composition to be desorbed by further injections of the gaseous composition. Preferably, the adsorbing porous material is in the form of particles or of a monolith. The adsorbing porous material can be, but is not limited to, aluminosilicate mineral, clay, porous glass, microporous charcoal, silica, resins, molecular sieves, active carbon, or synthetic compound. A molecular sieve is a material containing tiny pores of a precise and uniform size that is used as an adsorbent for gases and/or liquids. They often have open structures through which small molecules can diffuse. A preferred molecular sieve for this invention is zeolite.

The length of the chromatographic column is less than 5 meters. Preferably, the length of the chromatographic column is less than 2 meters.

More preferably, the length of the chromatographic column is less or equal to 1 meter. A shorter column enables a faster separation as the rate determining step of the process is the hold-up time.

The pressure in the chromatographic column is in the range of 0 to 10 bar. Preferably the pressure is in the range of 0.1 to 2 bar.

The temperature of the chromatographic column is in the range of 10 to 200° C. Preferably, the temperature is in the range of 30 to 100° C.

EXAMPLE

A chromatographic column (internal diameter 2 mm, length 1 m) has been filled with 2.4 g of zeolite 13X. The column is then flushed with a hydrogen flow in order to remove any potential trace of water.

Then the stationary phase is saturated by injections of silane $SiH_4$ (20 to 30 injections of 5 ml each) while the column is flushed by a hydrogen flow (10 ml/min) at a temperature of 80° C. and 1 bar.

The prepared column is used in the following conditions:
mobile phase (carrier gas): $H_2$ at 10 mL/min
1 bar, 80° C.
Detector: Mass spectrometer by electron impact (EI) model HP5972, SIM mode, source temperature 125° C., foreline pressure 90 mTorr 250 μL of silane at 1.5 bar are injected. In the detector, $SiH_4$ is fragmented in $Si^+$, $SiH^+$, $SiH_2^+$, and $SiH_3^+$. FIG. 1 shows the obtained spectra of the fragments $^{28}Si^+$ and $^{30}SiH_3^+$ (corresponding respectively to $^{28}Si$ and $^{30}Si$).

In the fraction of the peak between 5.5 and 5.94 minutes, the surface area below the peak is 8.8% for $^{28}Si$ of the total surface whereas the surface area is 7.1% for $^{30}Si$ of the total surface. Similarly, in the fraction of the peak between 6.63 and 8.5 minutes, the surface area for $^{28}Si$ is 23.4% (21.8% for $^{30}Si$). These results clearly show the enrichment of silane in $^{28}Si$ in these two fractions.

Moreover, this example shows that this process enables a very fast and efficient enrichment of isotopes. In this example, injections of silane can be made every 3 minutes.

The invention has been described with reference to preferred embodiments. However, many variations are possible within the scope of the invention.

The invention claimed is:
1. A process for enrichment of an isotope composition, comprising
  a. providing a chromatographic column having a stationary phase
  b. saturating the stationary phase with at least partially an isotope composition to be enriched c. injecting the composition to be enriched into the column together with a carrier gas d. enriching the composition by exploiting the difference in the isotope mass diffusivity.

2. The process according to claim 1, wherein the stationary phase is saturated exclusively with the isotope composition to be enriched.

3. The process according to claim 1, wherein the stationary phase is saturated the isotope composition enriched above its natural abundance.

4. The process according to any one of claims 1-3, wherein the composition to be enriched is in a gaseous form.

5. The process according to claims 4, wherein the gaseous form of the composition is formed by adding a ligand to the composition.

6. The process according to claim 5, wherein the ligand is hydrogen or fluoride.

7. The process according to any one of claims 1-3, wherein the carrier gas is helium or hydrogen.

8. The process according to any one of claims 1-3, wherein the stationary phase is an adsorbing porous material.

9. The process according to claim 8 wherein the adsorbing material is zeolite.

10. The process according to any one of claims 1-3, wherein the isotope composition comprises an element chosen from carbon, nitrogen, silicon, helium, boron, oxygen, sulphur, chloride, gallium, germanium, selenium, bromine, antimony, tellurium, uranium or compounds containing different isotopes.

11. The process according to claim 4, wherein the gaseous composition is one of $B_2H_6$, $NH_3$, $CH_4$, $H_2O$, $H_2S$, $HCl$, $GaH_3$, $GeH_4/Ge_2H_6$, $H_2Se$, $HBr$, $H_3Sb$, $H_2Te$, and $UF_6$ for obtaining an isotopically pure fraction of B, N, C, O, S, Cl, Ga, Ge, Se, Br, Sb, Te, and U, respectively.

12. The process according to claim 11, wherein the gaseous composition is silane for separating $^{28}Si$, $^{29}Si$ and $^{30}Si$.

13. The process according to any one of claims 1-3, wherein the pressure in the chromatographic column is from 0 to 10 bar.

* * * * *